(12) United States Patent
Hegarty et al.

(10) Patent No.: US 9,544,756 B2
(45) Date of Patent: Jan. 10, 2017

(54) HOME COMMUNICATION NETWORK DETERMINATION

(71) Applicant: Telefonaktiebolaget L M Ericsson (publ), Stockholm (SE)

(72) Inventors: Cormac Hegarty, Bromma (SE); Jan Holm, Gavle (SE); Gert Oster, Jarfalla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 330 days.

(21) Appl. No.: 13/872,545

(22) Filed: Apr. 29, 2013

(65) Prior Publication Data

US 2014/0323125 A1 Oct. 30, 2014

(51) Int. Cl.
*H04W 8/12* (2009.01)
*H04W 8/04* (2009.01)
*H04W 80/04* (2009.01)

(52) U.S. Cl.
CPC ............. *H04W 8/04* (2013.01); *H04W 8/12* (2013.01); *H04W 80/04* (2013.01)

(58) Field of Classification Search
CPC ................................. H04W 8/04; H04W 8/12
USPC .......................................................... 455/433
See application file for complete search history.

(56) References Cited

U.S. PATENT DOCUMENTS

2008/0225806 A1* 9/2008 Arian ................... H04W 8/065
370/338
2014/0269510 A1* 9/2014 Xu .......................... H04W 8/06
370/328

FOREIGN PATENT DOCUMENTS

WO 2013/030313 A1 3/2013
WO 2013/064397 A1 5/2013

OTHER PUBLICATIONS

Written Opinion and International Search Report issued by the ISA in International application No. PCT/EP2013/058881 dated Mar. 21, 2014, 14 pages.
"3rd Generation Partnership Project; Technical Specification Group Services and System Aspects; IP Multimedia Subsystem (IMS); Stage 2 (Release 11)" 3GPP TS 23228 V11.7.0, Dec. 2012, 290 pages.

(Continued)

*Primary Examiner* — Asghar Bilgrami
(74) *Attorney, Agent, or Firm* — Rothwell, Figg, Ernst & Manbeck, P.C.

(57) ABSTRACT

System, methods, nodes, and computer program for determining a home network of a UE roaming in a visited network are described. The UE sends a session invitation to a further UE. The method comprises receiving, by a control node in the home network, the session invitation. The method further comprises adding, by a control node in the home network, an indication of the home network identity and an indication for session invitation loopback routing, to the session invitation. The method further comprises sending, by a control node in the home network, the session invitation towards the visited network. The method further comprises receiving, by a control node in the visited network, a session invitation from the home network. The method further comprises determining, by the control node in the visited network, the home network based on the indication of the home network identity.

18 Claims, 6 Drawing Sheets

(56) References Cited

OTHER PUBLICATIONS

"3rd Generation Partnership Project; Technical Specification Group Core Network and Terminals; IP multimedia call control protocol based on Session Initiation Protocol (SIP) and Session Description Protocol (SDP); Stage 3 (Release 11)" 3GPP TS 24.229 V11.7.0, Mar. 2013, 786 pages.
Orange et al., "Support of ICS and SRVCC scenarios in RAVEL," SA WG2 Meeting #86E, S2-113869, Sep. 6-9, 2011, 8 pages.
"3rd Generation Partnership Project; Technical Specification Group Services and System Aspects; Study on roaming architecture for voice over IP Multimedia Subsystem (IMS) with local breakout (Release 11)" 3GPP TR 23.850 V11.0.0, Dec. 2011, 40 pages.

\* cited by examiner

HOME COMMUNICATION NETWORK DETERMINATION

TECHNICAL FIELD

The present invention relates to telecommunications and in particular to system, methods, nodes and computer program for determining a home communication network of a user equipment roaming in a visited communication network.

BACKGROUND

The GSMA (Global System for Mobile communications Association) agreement IR.65 covering the IMS (IP Multimedia Subsystem) Roaming and interconnect guidelines introduced requirements for routing of media for voice & video over IMS when a call originator is roaming. In this case routing should be at least as optimal as that of a current Circuit Switched (CS) domain. Furthermore, a charging model for roaming used in the CS domain shall be maintained for voice & video over IMS.

To meet these GSMA requirements a solution necessitates that the user plane is not routed towards a HPLMN (Home Public Land Mobile Network) of the A-party, unless so desired by the HPLMN of the A-party. The requirement is met by the deployment of P-CSCF (Proxy-Call Session Control Function) functionality in a VPLMN (Visited Public Land Mobile Network) and use of a TRF (Transit and Roaming Function) which receives the call related signalling after it has been processed by the A-party HPLMN (so called VPLMN Routing). This allows the A-party VPLMN to send both control and user plane towards the destination and therefore replicate the current CS voice & video roaming model.

To fulfill the above requirements the GSMA requested 3GPP (3$^{rd}$ Generation Partnership Project) to work out the detailed architecture and stage 3 specifications. RAVEL (Roaming Architecture for Voice over IMS with Local Breakout) is the 3GPP specification project name for this work. It was completed as part of 3GPP release 11 in Q4 2012. The term RAVEL has not been included into the actual 3GPP specifications, but the term RAVEL is used within the context of the present application to refer to the specification parts introduced into the 3GPP specifications by the RAVEL specification project.

A number of specifications outline the detailed mechanism for RAVEL namely 3GPP release 11.7.0 versions of TS 23.228 and TS 24.229.

TS.23.228 specifies that the HPLMN shall decide whether to perform the loopback procedure based on local policy and on knowledge of the support of the procedure in the VPLMN. Loopback is further clarified and specified by that the HPLMN shall send an indication to the VPLMN that this session set-up is a loopback to allow differentiation from any other incoming call. By this means the VPLMN is able to apply the correct treatment for this looped incoming leg including charging, service invocation on behalf of the HPLMN, and routing decisions.

Figure 1:
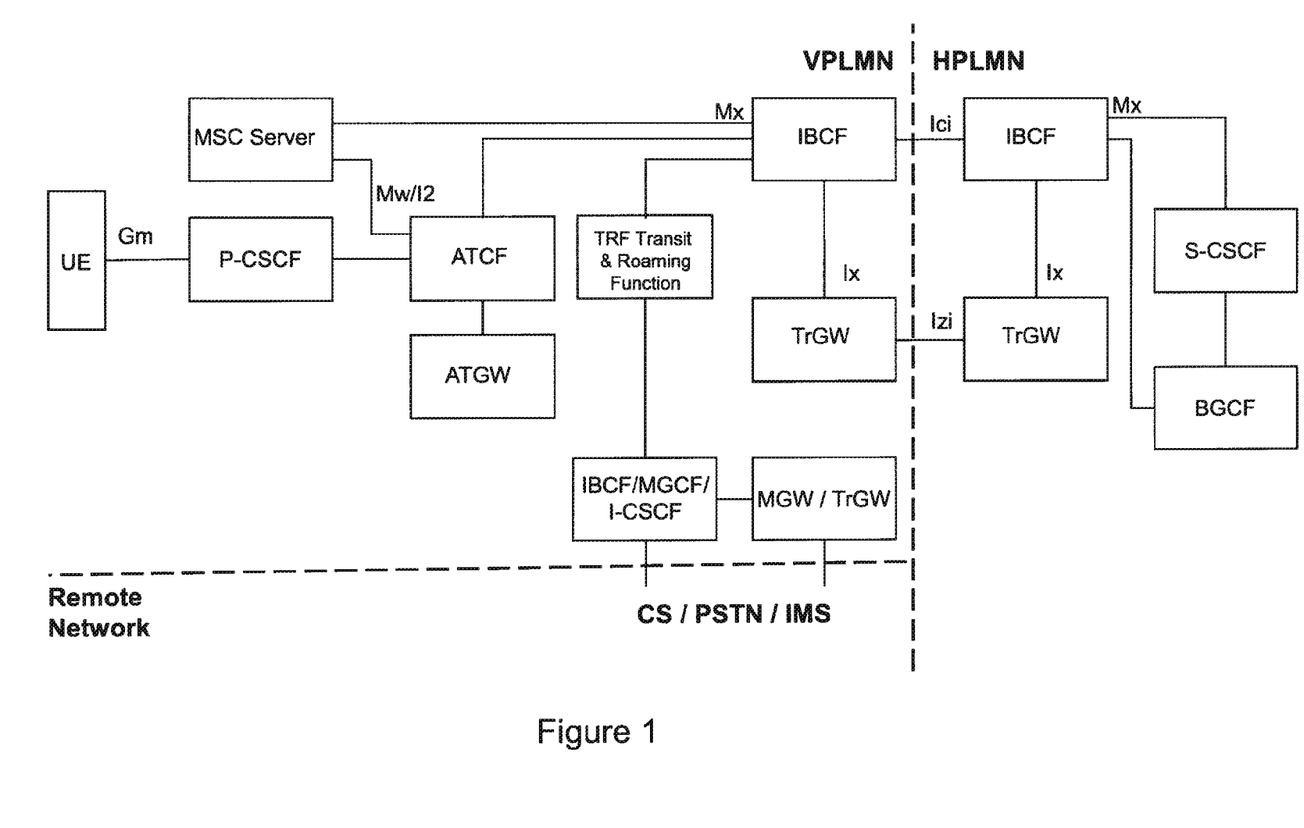
FIG. 1 is block diagram illustrating a system for IMS roaming and interconnect according to prior art.

The 3GPP TS 23.228 specification further describes an architecture whereby the P-CSCF is located in the visited network with VPLMN loopback possibility. The overall architecture defined in this specification for IMS Local Breakout with P-CSCF located in visited network and with VPLMN loopback possibility is shown in FIG. 1 and thereby represents prior art.

Figure 2:
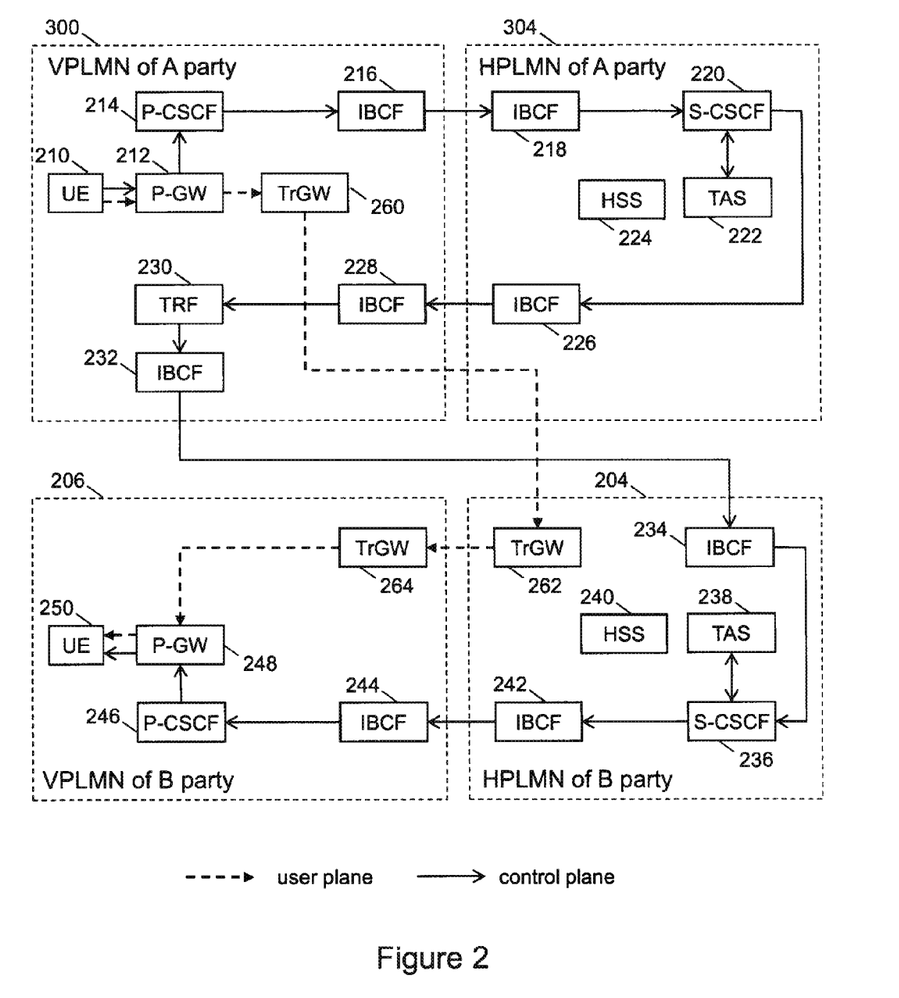
FIG. 2 is a procedure flow diagram illustrating a session establishment between a UE roaming in a visited communication network to a further UE in a further visited communication network according to prior art.

To further illustrate the prior art procedure, FIG. 2 shows a procedure flow diagram illustrating a session establishment between a UE (user equipment) 210 roaming in a VPLMN 300 to a further UE 250 belonging to a further HPLMN 204, where the UE 250 is roaming in a further VPLMN 206. In other words, this covers a session between two roaming subscribers of different HPLMN.

The roaming UE 210 of the A-party sends a session invitation to the P-CSCF 214 via the P-GW (Proxy-GateWay) 212. The P-CSCF 214 forwards the session invitation to the IBCF (Interconnection Border Control Function) 216. Based on operator policy, the P-CSCF adds a reference to a preferred TRF (Transit and Roaming Function) 230.

This first IBCF 216 in the VPLMN 300 allocates a TrGW (Transit GateWay) 260 for the media and follows standard optimal media routing procedures when forwarding the session invitation to allow this TrGW 260 to be bypassed if the session invitation later returns to the VPLMN 300 and no other intermediate nodes anchor the media before the request returns.

A transit network (not depicted in FIG. 2) and a IBCF 218 in the HPLMN 304 forward the session invitation to the S-CSCF 220 of the A-party. Nodes in the transit network and the IBCF 218 in the HPLMN 304 support optimal media routing procedures and allow their TrGWs (not depicted in FIG. 2) to be bypassed. Then the S-CSCF 220 performs service invocation with the help of a TAS (Telephony Application Server) 222. The HSS (Home Subscriber Server) 224 stores the related subscriber data of the A-party.

The S-CSCF 220 performs a routing decision, and based on local policy and on the facts that the UE 210 is roaming, a roaming agreement for VPLNM 300 call routing is in place, and home routing is not required, the S-CSCF 220 decides to route back the session invitation to the VPLMN 300 for further session routing. A loopback indicator is included in the session invitation to inform the VPLMN 300 that this session invitation is being routed back to the VPLMN 300 for session routing. If a reference to the preferred TRF 230 is available in the request, the S-CSCF 220 uses this information to route the session back to the VPLMN 300. If a reference to the preferred TRF 230 is not available, the S-CSCF 220 uses a default derived address to the TRF 230 to route the session back to the VPLMN 300.

The IBCF 226 in the HPLMN 304 and the transit network (not depicted in FIG. 2) forward the session invitation towards the indicated TRF 230 in the VPLMN 300. Functions in the transit network support optimal media routing procedures and allow their TrGWs to be bypassed.

The IBCF 228 in the VPLMN 300 receives the session invitation, notes that the SDP (Session Description Protocol) includes an alternative media address within the VPLMN 300 that allows bypassing of allocated TrGWs, applies optimal media routing procedures to remove any TrGWs allocated between the VPLMN 300 and HPLMN 304, and forwards the request to the indicated TRF 230.

Based on the loopback indicator, the TRF 230 detects that this is a loopback request. The TRF 230 then routes the session invitation toward the destination network. In this scenario the B-party UE 250 is determined to be available in a IMS network, so the session invitation is routed towards the B-party through an IBCF 232 in the VPLMN 300 and a transit network (not depicted in FIG. 2) to a IBCF 234 of the HPLMN 204 of the B-party UE 250.

The IBCF 234 of the HPLMN 204 then forwards the session invitation to the S-CSCF 236 of the B-party in the HPLMN 204. Then the S-CSCF 236 performs service invocation with the help of a TAS 238. The HSS 240 stores the related subscriber data of the B-party.

The S-CSCF 236 performs routing decision, and since the UE 250 of the B-party is roaming in a further VPLMN 206 the session invitation is forwarded via IBCF 242, a transit network (not depicted in FIG. 2) to a IBCF 244 of the further VPLMN 206.

The session invitation is delivered to the UE 250 via the P-CSCF 246 and the P-GW 248 of the VPLMN 206.

The above description covers the handling and routing of the session invitation control signaling (solid arrows in FIG. 2). The handling and routing of the related session user plane is shown as dashed arrows in FIG. 2.

The related session user plane originates in the UE 210 of the A-party and is routed via the P-GW 212 and TrGW 260 of the VPLMN 300 where the A-party is roaming. From the TrGW 260 the user plane is directed straight to the TrGW 262 of the B-party's HPLMN 204. From there the user plane is routed to the TrGW 264 of the VPLMN 206 where the B-party is roaming. There the user plane is sent via the P-GW 248 to the UE 250 of the B-party.

As can be seen from FIG. 2 and the above description, the routing of the user plane follows the same principles as the current CS voice & video roaming model.

Whilst 3GPP covers mechanisms for the VPLMN 300 to recognize a loopback session, 3GPP does not explain how the HPLMN 304 (from VPLMNs 300 perspective the "served network") shall be recognized and identified by the VPLMN 300.

In IMS roaming scenarios the need to identify the HPLMN 304 in loopback situations is necessary. A number of use cases being pushed by subscribers of the IMS network require that the VPLMN 300 is able to identify the HPLMN 304. The use cases may be any of the following: Roaming partner recognition & assertion; Service execution on behalf of served network (roaming partner); Correct charging and accounting information issued by VPLMN.

In CS based networks HPLMN determination is based on the IMSI (International Mobile Subscriber Identity) which provides both an identification of the HPLMN and the user. However IMSI is not available or not used in this IMS network scenario.

Furthermore, today it is not possible for the VPLMN to determine the HPLMN if a transit network is between them, which is typically the case in today's networks.

To meet the requirements for charging and accounting based on a home communication network and to invoke services on behalf of the home communication network, it is required for a visited communication network to determine a home communication network of a user equipment roaming in the visited communication network.

SUMMARY

It is an object of the invention to enable the visited communication network to perform charging and accounting based on a home communication network identity and to invoke services on behalf of the home communication network. It is also an object of the invention to provide corresponding methods, nodes, and computer programs.

The objects defined above are solved by the features of the independent claims. Preferred embodiments of the invention are described in the dependent claims.

According to an exemplary aspect of the invention, a method for determining a home communication network of a user equipment roaming in a visited communication network is provided, wherein the user equipment sends a session invitation to a further user equipment, the further user equipment is located in the visited communication network or a further communication network, the home communication network and the visited communication network are connected by a transit network. The method further comprises receiving, by a control node in the home communication network, the session invitation initiated by the visited communication network. The method further comprises adding, by a control node in the home communication network, an indication of the home communication network identity and an indication for session invitation loopback routing, to the session invitation, if the session invitation comprises an capability indicator for transit and roaming handling in the visited communication network. The method further comprises sending, by a control node in the home communication network, the session invitation towards the visited communication network, wherein the session invitation comprises the indication of the home communication network identity and the indication for session invitation loopback routing. The method further comprises receiving, by a control node in the visited communication network, a session invitation from the home communication network, the session invitation comprising the indication of the home communication network identity and the indication for session invitation loopback routing. The method further comprises determining, by the control node in the visited communication network, the home communication network based on the indication of the home communication network identity, if the session invitation comprises the indication for session invitation loopback routing.

According to another exemplary aspect of the invention, a method in a control node in a home communication network for handling an indication of the home communication network identity of a user equipment associated with a session invitation initiated by the user equipment roaming in a visited communication network is provided, wherein the user equipment sends the session invitation to a further user equipment, the further user equipment is located in the visited communication network or a further communication network, the home communication network and the visited communication network are connected by a transit network. The method comprises receiving the session invitation initiated by the visited communication network. The method further comprises adding an indication of the home communication network identity and an indication for session invitation loopback routing to the session invitation, if the session invitation comprises a capability indicator for transit and roaming handling in the visited communication network. The method further comprises sending the session invitation towards the visited communication network, wherein the session invitation comprises the indication of the home communication network identity and the indication for session invitation loopback routing.

According to another exemplary aspect of the invention, a method in a control node in a visited communication network for determining a home communication network of a user equipment roaming in the visited communication network is provided, wherein the user equipment sends a session invitation to a further user equipment, the further user equipment is located in the visited communication network or a further communication network, the home communication network and the visited communication network are connected by a transit network. The method comprises receiving a session invitation from the home communication network, the session invitation comprising the indication of the home communication network identity and the indication for session invitation loopback routing. The method further comprises determining the home communication network based on the indication of the home communication network identity, if the session invitation comprises the indication for session invitation loopback routing.

The method may further comprise the triggering, based on the determined home communication network, services on behalf of the home communication network. The method further comprises logging of the determined home communication network for charging and accounting purposes.

According to another exemplary aspect of the invention, a control node in a home communication network of a user equipment for handling an indication of the home communication network identity associated with a session invitation initiated by the user equipment roaming in a visited communication network is provided, wherein the user equipment sends the session invitation to a further user equipment, the further user equipment is located in the visited communication network or a further communication network, the home communication network and the visited communication network are connected by a transit network. The control node is capable of receiving the session invitation initiated by the visited communication network. The control node is capable of adding an indication of the home communication network identity and an indication for session invitation loopback routing to the session invitation, if the session invitation comprises a capability indicator for transit and roaming handling in the visited communication network. The control node is capable of sending the session invitation towards the visited communication network, wherein the session invitation comprises the indication of the home communication network identity and the indication for session invitation loopback routing.

According to another exemplary aspect of the invention, a control node in a visited communication network for determining a home communication network of a user equipment roaming in a visited communication network is provided, wherein the user equipment sends a session invitation to a further user equipment, the further user equipment is located in the visited communication network or a further communication network, the home communication network and the visited communication network are connected by a transit network. The control node is capable of receiving a session invitation from the home communication network, the session invitation comprising the indication of the home communication network identity and the indication for session invitation loopback routing. The control node is capable of determining the home communication network based on the indication of the home communication network identity, if the session invitation comprises the indication for session invitation loopback routing.

According to another exemplary aspect of the invention, a communication system for determining a home communication network of a user equipment roaming in a visited communication network is provided, wherein the user equipment sends a session invitation to a further user equipment, the further user equipment is located in the visited communication network or a further communication network, the home communication network and the visited communication network are connected by a transit network. The communication system comprises a control node in the home communication network, a control node in the visited communication network, an interconnection control node in the home communication network, and an interconnection control node in the visited communication network.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

In the following, methods and network nodes for determining a home communication network of a user equipment roaming in a visited communication network and associated computer programs according to the invention are described in more detail.

Within the context of the present application, the term "communication network" may particularly denote a collection of nodes or entities, related transport links, and associated management needed for running a service, for example a telephony service or a packet transport service. Depending on the service, different node types or entities may be utilized to realize the service. A network operator owns the communication network, and offers the implemented services to its subscribers. Typical examples of a communication network are radio access network (such as GSM, 3G, WCDMA, CDMA, LTE, 802.11), mobile backhaul network, or core network (such as IMS, CS, Packet Core).

Within the context of the present application, the term "control node" refers to a node of the communication network primarily performing control procedures for sessions and services of a subscriber of the communication network. The term typically refers to those entities of the communication network handling control plane, subscriber data, services, or signaling traffic associated with user traffic in the communication network. In a core network a control node may be a Mobility Management Entity (MME), P-CSCF, S-CSCF, TRF, or TAS nodes.

Within the context of the present application, the term "home communication network" refers to a communication network in which a subscriber's profile is held. Subscribers roaming to other communication networks will receive subscription information from the home communication network, or also called HPLMN for short. Within the context of the present application, those other communication networks are called "visited communication network", or also called VPLMN for short.

Within the context of the present application, the term "transit network" refers to a communication network used for interconnection of communication networks. Transit networks simplify the peering between communication networks of different network operators. A network operator just establishes peering with the transit network operator instead of establishing peering with all other communication networks of other network operators. In order to reach a subscriber of another communication network, a session invitation is passed to the transit network which then takes care of routing and delivering the session invitation to the destination communication network.

Within the context of the present application, the term "interconnection control node" refers to a control node of a communication network. The term typically refers to those entities of the communication network handling the interface to the transit network or to other communication networks. In a core network an interconnection control node may be an IBCF node.

Within the context of the present application, the term "charging" refers to a collection of data characterizing the usage level of a network. Charging data is further on used to bill the subscriber. The term "accounting" refers also to a collection of data characterizing the usage level of a network. In contrast to charging, accounting is done between network operators and refers to the invoicing of expenses a network operator has caused by subscribers of other network operators. So the network operator of a VPLMN collects charging and accounting data for subscribers roaming into the VPLMN. The collected charging data are provided from the VPLMN to the HPLMN of the subscriber such that the HPLMN is able to bill the subscriber. The collected accounting data are exchanged on an aggregated level between VPLMN and HPLMN in order for the VPLMN to bill the HPLMN for the network usage of the HPLMN's subscribers in the VPLMN.

Within the context of the present application, the term "feature-capability indicator for transit and roaming handling" may refer to a Feature-Caps header field specified in IETF RFC 6809 with a g.3gpp.trf feature-capability indicator carried in a SIP INVITE message. The SIP INVITE message corresponds to a session invitation and is sent from the visited communication network to the home communication network. With the feature-capability indicator for transit and roaming handling the visited communication network indicates to the home communication network that the visited communication network supports the standard RAVEL roaming routing according to 3GPP specifications.

Within the context of the present application, the term "indication for session invitation loopback routing" may refer to a Feature-Caps header field specified in IETF RFC 6809 with a g.3gpp.loopback indicator carried in a SIP INVITE message. The SIP INVITE message corresponds to a session invitation and is sent from the home communication network to the visited communication network. With the indication for session invitation loopback routing the home communication network indicates to the visited communication network that this SIP INVITE message is returned to the visited communication network and the further routing of the SIP INVITE message to the destination shall be performed by the visited communication network according to the standard RAVEL roaming routing defined by 3GPP specifications.

Within the context of the present application, the term "indication of the home communication network identity" may refer to information in a SIP message identifying the home communication network of the originator of the SIP message. The indication of the home communication network identity can be carried in a SIP INVITE message.

Figure 3:
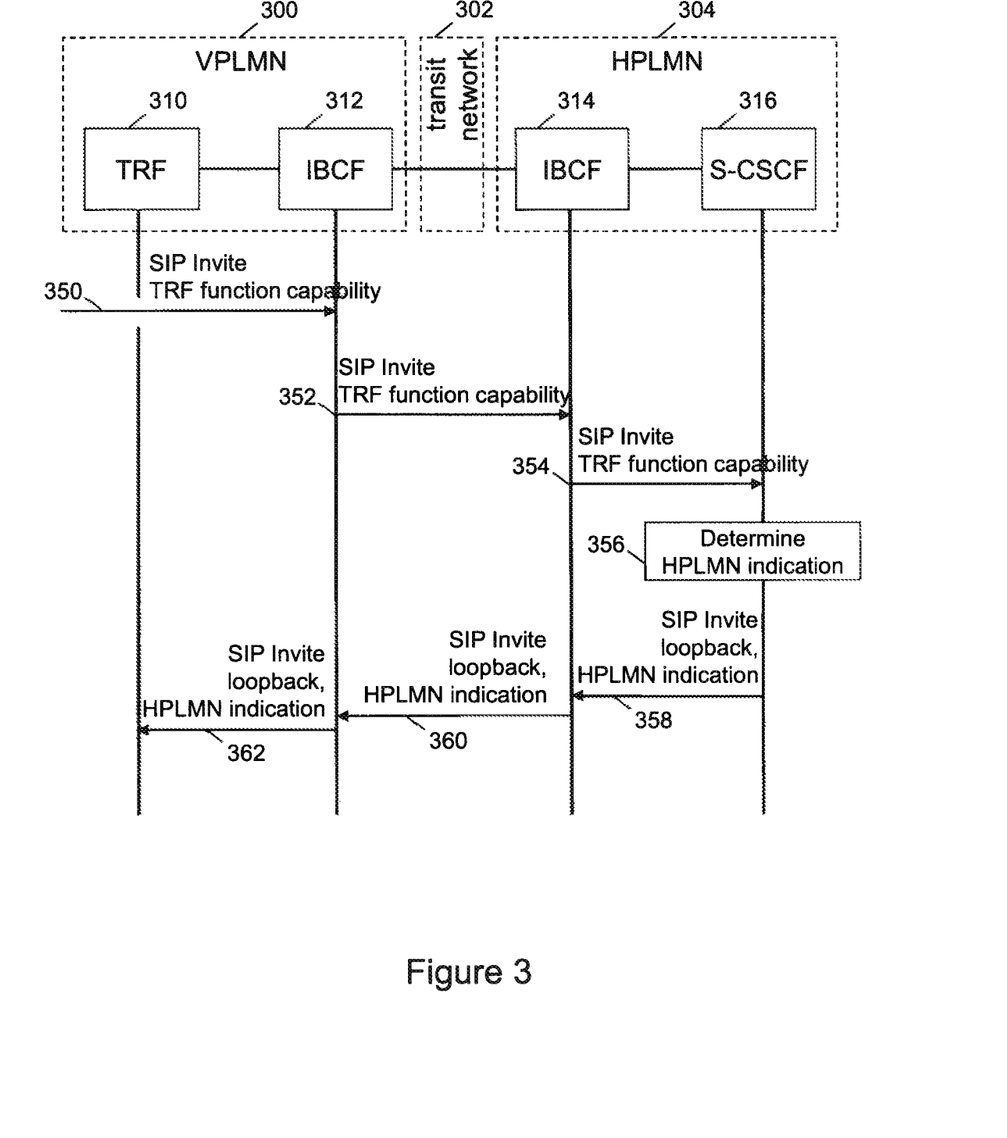
FIG. 3 is a procedure flow diagram illustrating the determining of a home communication network of a user equipment roaming in a visited communication network according to the invention.

Referring to FIG. 3, this figure shows a procedure flow diagram illustrating the determining of a home communication network 304 of a user equipment 210 roaming in a visited communication network 300 according to an embodiment.

The figure shows a method for determining a home communication network 304 of a user equipment 210 roaming in a visited communication network 300, wherein the user equipment 210 sends a session invitation to a further user equipment 250, the further user equipment 250 being located in the visited communication network 300 or a further communication network 206, the home communication network 304 and the visited communication network 300 being connected by a transit network 302.

The figure shows the simplified flow of a SIP INVITE message looped from a VPLMN 300 corresponding to a visited communication network, via the HPLMN 304 corresponding to a visited communication network, back to the VPLMN 300. The VPLMN 300 and the HPLMN 304 are interconnected via a transit network 302, however, the internal details of this transit network 302 are omitted for clarity reasons, as these are not relevant in this context. The shown subsection of a session establishment corresponds to the RAVEL roaming routing defined by 3GPP specifications.

The VPLMN 300 may comprise a number of nodes, for clarity reasons a TRF node 310 and an IBCF 312 is shown, which are relevant for handling this flow in the VPLMN 300. The HPLMN 304 may comprise a number of nodes, for clarity reasons an S-CSCF 316 and an IBCF 314 is shown, which are relevant for handling this flow in the HPLMN 304.

The subsection of the flow may start by receiving a SIP INVITE message 350 in an IBCF 312 of the VPLMN 300. The IBCF 312 may correspond to the IBCF 216 of FIG. 2. So a UE 210 of the A-party may have originated the SIP INVITE message and the SIP INVITE message may be forwarded by the VPLMN 300 towards the HPLMN 304. The SIP INVITE message 350 may comprise a feature-capability indicator for transit and roaming handling, shown as TRF function capability in the FIG. 3.

The IBCF 312 may forward the SIP INVITE message 352 to the IBCF 314 of the HPLMN 304. The transit network 302 may be traversed to reach the IBCF 314 of the HPLMN 304. The SIP INVITE message 352 may comprise the TRF function feature-capability indicator.

The IBCF 314 may forward the SIP INVITE message 354 to the S-CSCF 316 of the HPLMN 304. The SIP INVITE message 354 may comprise the TRF function feature-capability indicator.

The S-CSCF 316 receiving the SIP INVITE message 354 initiated by the VPLMN 300 may determine that this is a session invitation from a UE 210 of an own subscriber roaming in a VPLMN 300. As the SIP INVITE message 354 may comprise the TRF function feature-capability indicator, the S-CSCF 316 may determine to apply RAVEL roaming routing as defined by 3GPP specifications. The TRF function feature-capability indicator indicates that the VPLMN 300 supports the RAVEL roaming routing as defined by 3GPP specifications.

When receiving a SIP INVITE message 354 in an S-CSCF, the S-CSCF 316 may determine in 356 an indication of the home communication network identity. This may only be done if the SIP INVITE message 354 comprises the TRF function feature-capability indicator. The indication of the home communication network identity may be preconfigured information in the S-CSCF 316, or by alternative, the S-CSCF 316 may query the indication of the home communication network identity from a central database such as a HSS, for example the HSS 224 of FIG. 2, or a management system. The indication of the home communication network identity is labeled HPLMN indication in FIG. 3.

In a next step the S-CSCF 316 may remove the TRF function feature-capability indicator from the SIP INVITE message and may add the indication for session invitation loopback routing, in the FIG. 3 labeled as "loopback". Also the determined indication of the home communication network identity may be added to the SIP INVITE message, in the FIG. 3 labeled as "HPLMN indication". The HPLMN indication may only be added if determined in the previous step. So the HPLMN indication may only be added if the SIP INVITE 354 comprises the TRF function feature-capability indicator.

This modified SIP INVITE message 358 may be sent towards the VPLMN 300 by the S-CSCF 316. The SIP INVITE message 358 may be received in an IBCF 314 and forwarded in SIP INVITE message 360. The SIP INVITE message 358 may contain the loopback and the HPLMN indication.

The SIP INVITE message 360 may be transported via the transit network 302 to the IBCF 312 of the VPLMN 300. The SIP INVITE message 360 may contain the loopback and the HPLMN indication.

The IBCF 312 may forward the SIP INVITE message 362 to a TRF node 310. The SIP INVITE message 362 may contain the loopback and the HPLMN indication.

The TRF node 310 may receive the SIP INVITE message 362. Having received the loopback and the HPLMN indication, the TRF node 310 may determine that this is a looped session invitation and determine that the HPLMN 304 instructs the VPLMN 300 to carry out the routing of the SIP INVITE message according to the RAVEL roaming routing defined by 3GPP specifications.

Furthermore, the TRF node 310 may use the received HPLMN indication to determine the HPLMN 304. The TRF node 310 may perform charging and accounting for the HPLMN 304 and to invoke services on behalf of the HPLMN 304.

The procedure flow diagram in FIG. 3 shows a case where the same pair of IBCF 312 and IBCF 314 may be used for routing of the SIP INVITE message from the VPLMN 300 to the HPLMN 304 and back. By alternative, also different IBCF nodes may be used for the different directions. This alternative is shown in FIG. 2 where IBCF 216 and IBCF 218 are used for the VPLMN 300 to HPLMN 304 direction, while IBCF 226 and IBCF 228 are used for the HPLMN 304 to VPLMN 300 direction. Also a mixture of both scenarios may be possible, so using the same IBCF 312 in the VPLMN 300, but different IBCF in the HPLMN 304, or the same IBCF 314 in the HPLMN 304 and different IBCF in the VPLMN 300.

The HPLMN indication corresponding to the indication of the home communication network 304 may be carried within the session invitation corresponding to the SIP INVITE message 358, 360, 362 as extra parameter in, or is part of any of the following Session Initiation Protocol headers: Feature-Caps header field, Route header field, or Via header field.

Figure 4:
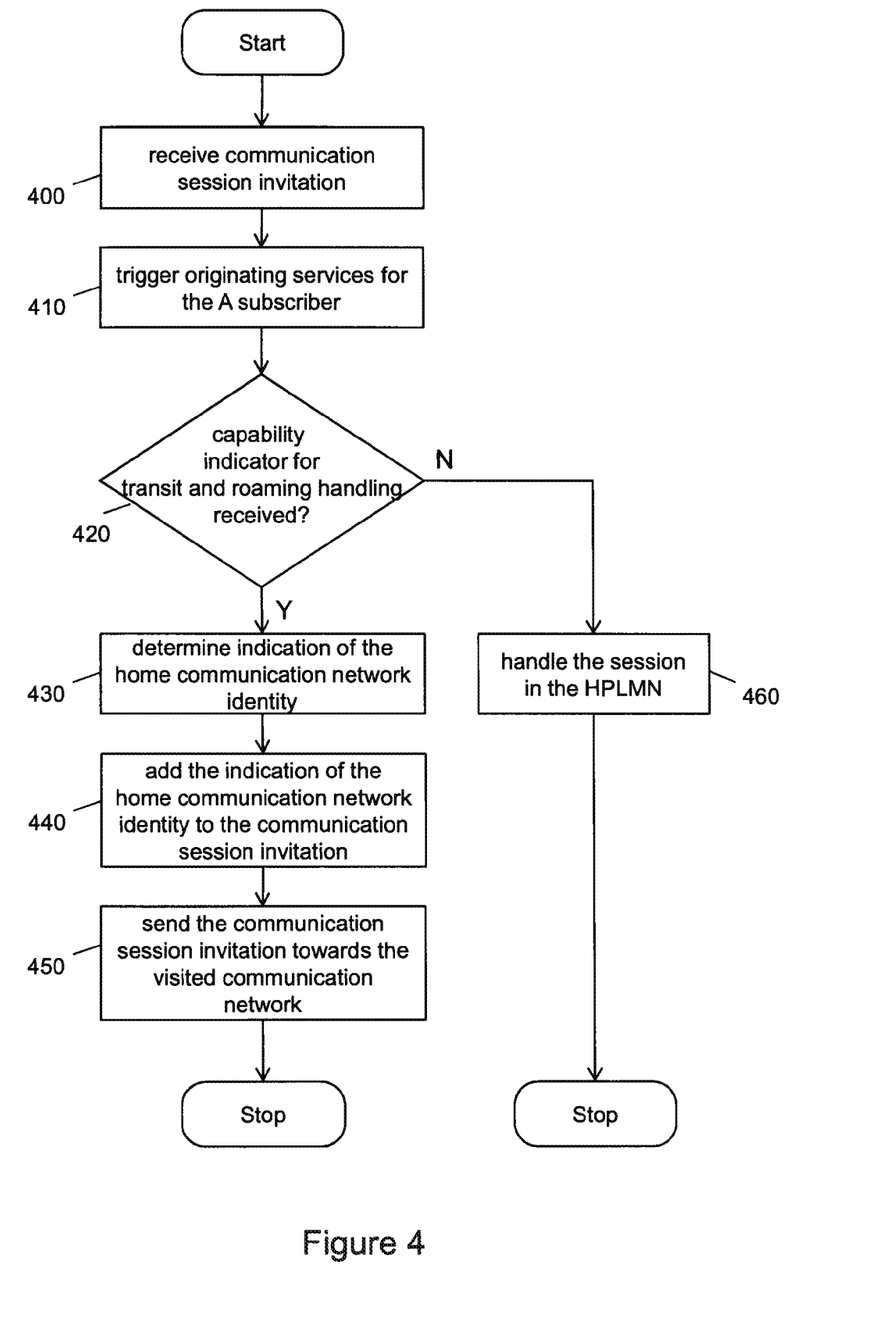
FIG. 4 is a flow diagram illustrating a method in a control node in the home communication network.

Referring to FIG. 4, this figure shows a flow diagram illustrating a method in a control node in a home communication network according to an embodiment. The control node may correspond to an S-CSCF 316 in a HPLMN 304 as illustrated in FIG. 3.

In step 400 the control node 316 may receive a communication session invitation, which may correspond to a SIP INVITE message.

Handling of a SIP INVITE message in an S-CSCF may be applied, a typical example of such handling may be in step 410 the triggering of originating services for the A-party.

In step 420 it may be determined whether a feature-capability indicator for transit and roaming handling has been received. This indicator may be received in communication session invitation. If no such indicator was received, so the answer is no, the procedure flow continues with session handling in the HPLMN 304 as indicated in step 460 and the flow ends. If no indication for transit and roaming handling has been received, the VPLMN 300 does not support the standard RAVEL roaming routing defined by 3GPP specifications, or the VPLMN 300 operator does not want to offer this capability to this HPLMN 304.

If in step 420 a feature-capability indicator for transit and roaming handling has been received, so the answer is yes, the procedure flow may continue with step 430. In step 430 the indication of the home communication network identity is determined. The indication of the home communication network identity may be preconfigured information in the S-CSCF 316, or by alternative, the S-CSCF 316 may query the indication of the home communication network identity from a central database such as a HSS, for example the HSS 224 of FIG. 2, or a management system.

In step 440 the determined indication of the home communication network identity may be added to the communication session invitation, so to the SIP INVITE message. Also the indication for transit and roaming handling is removed from the SIP INVITE message and an indication for session invitation loopback routing is added to the message.

In step 450 the modified communication session invitation may be sent towards the visited communication network, so to the VPLMN 300, and the procedure ends.

Figure 5:
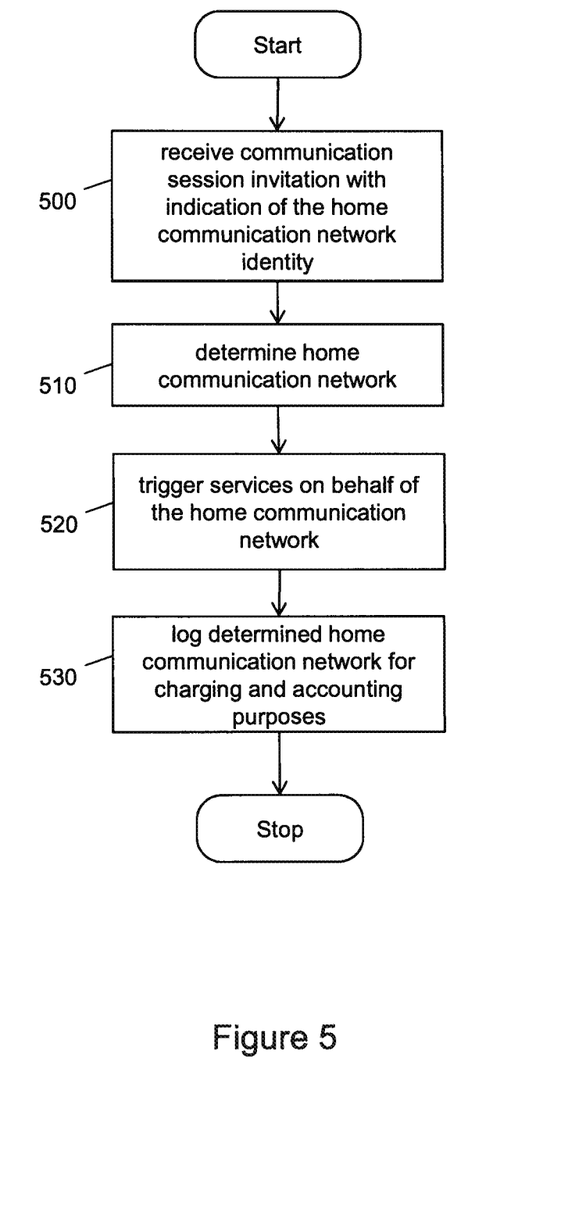
FIG. 5 is a flow diagram illustrating a method in a control node in the visited communication network.

Referring to FIG. 5, this figure shows a flow diagram illustrating a method in a control node in a visited communication network according to an embodiment. The control node may correspond to a TRF node 310 in a VPLMN 300 as illustrated in FIG. 3.

In step 500 the control node 310 may receive a communication session invitation, which may correspond to a SIP INVITE message. The message may comprise an indication of the home communication network identity, so a HPLMN indication.

In step 510 the received indication of the home communication network identity may be used to determine the HPLMN 304.

In step 520 services may be triggered on behalf of the determined HPLMN 304.

In step 530 charging and accounting may be performed for the determined HPLMN 304 and the procedure flow ends.

By alternative, steps 520 and 530 may be performed in different order.

Figure 6:
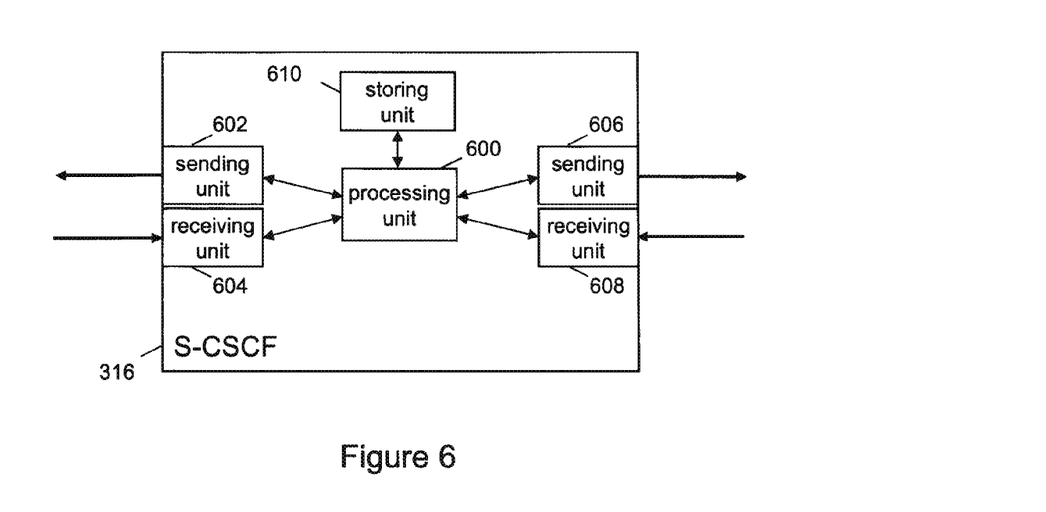
FIG. 6 is a block diagram illustrating a control node in the home communication network.

Referring to FIG. 6, this figure shows a block diagram illustrating a control node for handling an indication of the home communication network 304 identity in the home communication network 304 according to an embodiment. The illustrated entity may correspond to the S-CSCF 316 in FIG. 3. The control node 316 may be adapted to perform one or more steps of the above described method shown in FIG. 4.

The control node 316 may comprise a number of functional units, which are described in further detail below and which are adapted to perform respective method steps.

A processing unit 600 of the control node 316 may be adapted to receive the session invitation initiated by the visited communication network. The processing unit 600 may further be adapted to add an indication of the home communication network identity and an indication for session invitation loopback routing to the session invitation, if the session invitation comprises a feature-capability indicator for transit and roaming handling in the visited communication network. The processing unit 600 may further be adapted to send the session invitation towards the visited communication network, wherein the session invitation comprises the indication of the home communication network identity and the indication for session invitation loopback routing. In a practical implementation the processing unit 600 may be one processor taking care of all the above functions, or may also be distributed over more than one processor, wherein the functions are distributed over the available processors.

The control node 316 may further comprise a sending unit 602 and a receiving unit 604 via which the control node 316 can communicate with further nodes of the HPLMN 304. The control node 316 may also comprise a sending unit 606 and a receiving unit 608 via which the control node 316 can communicate with the IBCF 314 or with other nodes of the HPLMN 304. The sending unit 602, 606 and the receiving unit 604, 608 may be part of a respective interface, respectively. Alternatively, the control node 316 may comprise a single send and receive interface. This interface could then be used for both the communication with the further nodes of the HPLMN 304 and with the IBCF 314. The sending unit 602, 606 may send out signaling messages composed by the processing unit 600. The receiving unit 604, 608 may receive signaling messages originating from other nodes of the HPLMN 304, and forward the received signaling messages to the processing unit 600 for handling.

The control node 316 may also comprise a storing unit 610 for storing information related to the handling of an indication of the home communication network 304 identity. The storing unit 610 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 610 may be used by the processing unit 600 to store information, for example a determined indication of the home communication network 304 identity, or program code.

Figure 7:
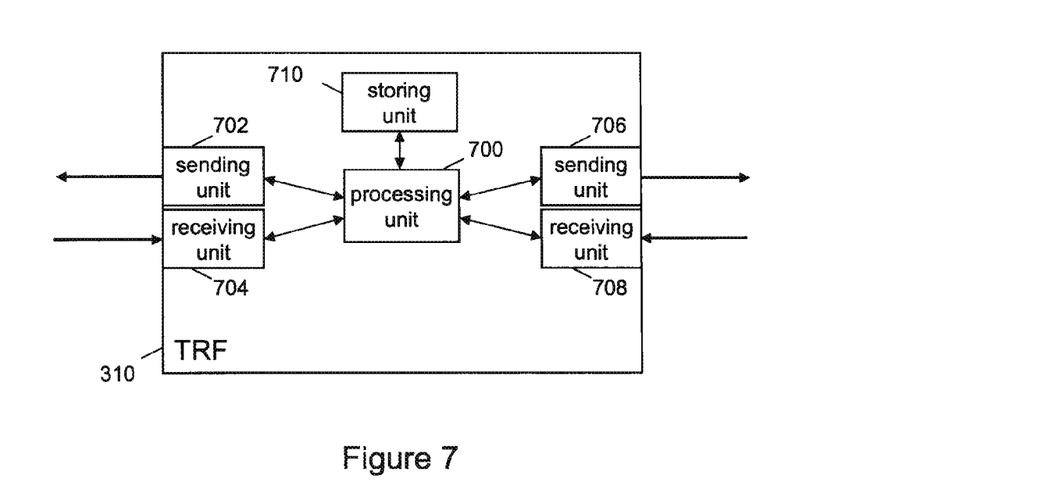
FIG. 7 is a block diagram illustrating a control node in the visited communication network.

Referring to FIG. 7, this figure shows a block diagram illustrating a control node for determining a home communication network 304 in the visited communication network 300 according to an embodiment. The illustrated entity may correspond to the TRF 310 in FIG. 3. The control node 310 may be adapted to perform one or more steps of the above described method shown in FIG. 5.

The control node 310 may comprise a number of functional units, which are described in further detail below and which are adapted to perform respective method steps.

A processing unit 700 of the control node 310 may be adapted to receive a session invitation from the home communication network, the session invitation comprising the indication of the home communication network identity and the indication for session invitation loopback routing. The processing unit 700 of the control node may be further adapted to determine the home communication network based on the indication of the home communication network identity, if the session invitation comprises the indication for session invitation loopback routing. The processing unit 700 of the control node may be further adapted to trigger, based on the determined home communication network, services on behalf of the home communication network. The processing unit 700 of the control node may be further adapted to log of the determined home communication network for charging and accounting purposes. In a practical implementation the processing unit 700 may be one processor taking care of all the above functions, or may also be distributed over more than one processor, wherein the functions are distributed over the available processors.

The control node 310 may further comprise a sending unit 702 and a receiving unit 704 via which the control node 310 can communicate with further nodes of the VPLMN 300. The control node 310 may also comprise a sending unit 706 and a receiving unit 708 via which the control node 310 can communicate with the IBCF 312 or with other nodes of the VPLMN 300. The sending unit 702, 706 and the receiving unit 704, 708 may be part of a respective interface, respectively. Alternatively, the control node 310 may comprise a single send and receive interface. This interface could then be used for both the communication with the further nodes of the VPLMN 300 and with the IBCF 312. The sending unit 702, 706 may send out signaling messages composed by the processing unit 700. The receiving unit 704, 708 may receive signaling messages originating from other nodes of the VPLMN 300, and forward the received signaling messages to the processing unit 700 for handling.

The control node 310 may also comprise a storing unit 710 for storing information related to the determining a home communication network 304. The storing unit 710 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 710 may be used by the processing unit 700 to store information, for example a determined home communication network 304, or program code.

According to another embodiment, a computer program is provided. The computer program may be executed by the processing units 600 and/or 700 of the above mentioned control nodes 310, 316 such that a method for determining a home communication network 304 of a user equipment 210 roaming in a visited communication network 300 as described above with reference to FIGS. 4 and 5 may be carried out or be controlled. In particular, the entities 310, 316 may be caused to operate in accordance with the above described method by executing the computer program.

The computer program may be embodied as computer code, for example of a computer program product. The computer program product may be stored on a computer readable medium, for example a disk or the storing unit 610 and/or 710 of the entities 310, 316, or may be configured as downloadable information.

One or more embodiments as described above may enable at least one of the following technical effects: VPLMN 300 can recognize and assert the HPLMN 304; VPLMN 300 can securely invoke services on behalf of the HPLMN 304; Recognition and assertion can be done in a multi-vendor deployment; Reduces the need to locally configure deployment dependent HPLMN 304 recognition policies and mechanisms; VPLMN 300 provides information on the HPLMN 304 thus ensuring charging and accounting is correct.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for determining a home communication network of a user equipment roaming in a visited communication network, wherein the user equipment sends a session invitation to a further user equipment, the further user equipment being located in the visited communication network or a further communication network, the home communication network and the visited communication network being connected by a transit network, the method comprising:
   receiving, by a control node in the home communication network, the session invitation initiated by the visited communication network;
   adding, by the control node in the home communication network, an indication of the home communication network identity and an indication for session invitation loopback routing, to the session invitation, if the session invitation comprises a capability indicator for transit and roaming handling in the visited communication network; and
   sending, by the control node in the home communication network, the session invitation towards the visited communication network, wherein the session invitation comprises the indication of the home communication network identity and the indication for session invitation loopback routing.

2. The method according to claim 1, further comprising:
   receiving, by an interconnection control node in the home communication network, the session invitation comprising the indication of the home communication network identity and the indication for session invitation loopback routing; and
   sending, by the interconnection control node in the home communication network, the session invitation comprising the indication of the home communication network identity and the indication for session invitation loopback routing to a peering interconnection control node of the visited communication network.

3. The method according to claim 1, further comprising:
   receiving, by an interconnection control node in the visited communication network, the session invitation comprising the indication of the home communication network identity and the indication for session invitation loopback routing; and
   sending, by the interconnection control node in the visited communication network, the session invitation comprising the indication of the home communication network identity and the indication for session invitation loopback routing to the control node in the visited communication network.

4. The method according to claim 1, wherein the session invitation is carried via a Session Initiation Protocol.

5. The method according to claim 2, wherein the control node and the interconnection control node are part of an IP Multimedia Subsystem.

6. The method according to claim 5, wherein the indication of the home communication network identity is carried within the session invitation as extra parameter in, or is part of any of the following Session Initiation Protocol headers:
   Feature-Caps header field,
   Route header field, or
   Via header field.

7. A method in a control node in a home communication network for handling an indication of the home communication network identity of a user equipment associated with a session invitation initiated by the user equipment roaming in a visited communication network, wherein the user equipment sends the session invitation to a further user equipment, the further user equipment being located in the visited communication network or a further communication network, the home communication network and the visited communication network being connected by a transit network, the method comprising:
   receiving the session invitation initiated by the visited communication network;
   determining whether the received session invitation comprises a capability indicator for transit and roaming handling in the visited communication network;
   in response to determining that the received session invitation comprises said capability indicator, modifying the received session invitation, wherein modifying the received session invitation comprises adding to the received session invitation an indication of the home communication network identity and an indication for session invitation loopback routing, thereby producing a modified session invitation comprising the indication of the home communication network identity and the indication for session invitation loopback routing; and
   sending the modified session invitation towards the visited communication network.

8. A method in a control node in a visited communication network for determining a home communication network of a user equipment roaming in the visited communication network, wherein the user equipment sends a session invitation to a further user equipment, the further user equipment being located in the visited communication network or a further communication network, the home communication network and the visited communication network being connected by a transit network, the method comprising:
   receiving a session invitation from the home communication network, the session invitation comprising an indication of the home communication network identity and an indication for session invitation loopback routing;
   determining if the session invitation comprises the indication for session invitation loopback routing; and
   in response to determining that the session invitation comprises the indication for session invitation loopback routing, determining the home communication network based on the indication of the home communication network identity.

9. The method according to claim 8, further comprising:
   triggering, based on the determined home communication network, services on behalf of the home communication network; and
   logging of the determined home communication network for charging and accounting purposes.

10. A control node in a home communication network of a user equipment for handling an indication of the home communication network identity associated with a session invitation initiated by the user equipment roaming in a visited communication network, wherein the user equipment sends the session invitation to a further user equipment, the further user equipment being located in the visited communication network or a further communication network, the home communication network and the visited communication network being connected by a transit network, the control node being capable of:
- receiving the session invitation initiated by the visited communication network;
- adding an indication of the home communication network identity and an indication for session invitation loopback routing to the session invitation, if the session invitation comprises a capability indicator for transit and roaming handling in the visited communication network; and
- sending the session invitation towards the visited communication network, wherein the session invitation comprises the indication of the home communication network identity and the indication for session invitation loopback routing.

11. A control node in a visited communication network for determining a home communication network of a user equipment roaming in a visited communication network, wherein the user equipment sends a session invitation to a further user equipment, the further user equipment being located in the visited communication network or a further communication network, the home communication network and the visited communication network being connected by a transit network, the control node being capable of:
- receiving a session invitation from the home communication network, the session invitation comprising an indication of the home communication network identity and an indication for session invitation loopback routing;
- determining if the session invitation comprises the indication for session invitation loopback routing; and
- in response to determining that the session invitation comprises the indication for session invitation loopback routing, determining the home communication network based on the indication of the home communication network identity.

12. A communication system for determining a home communication network of a user equipment roaming in a visited communication network, wherein the user equipment sends a session invitation to a further user equipment, the further user equipment being located in the visited communication network or a further communication network, the home communication network and the visited communication network being connected by a transit network, the communication system comprising:
- a first control node in the home communication network according to claim 10;
- a second control node in the visited communication network;
- an interconnection control node in the home communication network; and
- an interconnection control node in the visited communication network, wherein
- the first control node being capable of:
- receiving the session invitation initiated by the visited communication network;
- adding an indication of the home communication network identity and an indication for session invitation loopback routing to the session invitation, if the session invitation comprises a capability indicator for transit and roaming handling in the visited communication network; and
- sending the session invitation towards the visited communication network, wherein the session invitation comprises the indication of the home communication network identity and the indication for session invitation loopback routing, and
- the second control node being capable of:
- receiving a session invitation from the home communication network, the session invitation comprising the indication of the home communication network identity and the indication for session invitation loopback routing; and
- determining the home communication network based on the indication of the home communication network identity, if the session invitation comprises the indication for session invitation loopback routing.

13. A computer program on a non-transitory computer readable medium, which, when being executed by at least one processor, is adapted to carry out or control a method for determining a home communication network of a user equipment roaming in a visited communication network, the method comprising:
- adding an indication of the home communication network identity and an indication for session invitation loopback routing, to a received session invitation, if the session invitation comprises a capability indicator for transit and roaming handling in the visited communication network; and
- sending the session invitation towards the visited communication network, wherein the session invitation comprises the indication of the home communication network identity and the indication for session invitation loopback routing.

14. The method of claim 1, further comprising:
- receiving, by a control node in the visited communication network, a session invitation from the home communication network, the session invitation comprising the indication of the home communication network identity and the indication for session invitation loopback routing; and
- determining, by the control node in the visited communication network, the home communication network based on the indication of the home communication network identity, if the session invitation comprises the indication for session invitation loopback routing.

15. The method of claim 1, further comprising:
- the control node in the home communication network determining whether the received session invitation comprises a capability indicator for transit and roaming handling in the visited communication network;
- the control node performing said adding step in response to determining that the received session invitation comprises said capability indicator; and
- the control node further removing said capability indicator from the received session invitation, wherein
- the session invitation sent by the control node in the home communication network towards the visited communication network does not include said capability indicator.

16. The method of claim 7, wherein modifying the received session invitation further comprises removing said capability indicator from said session invitation.

17. The method of claim 7, wherein the modified session invitation is a Session Initiation Protocol (SIP) INVITE message.

18. The method of claim 17, wherein adding the indication of the home communication network identity to the received session invitation comprises including the home communication network identity in one of said following SIP INVITE header fields: a Feature-Caps header field, a Route header field, and a Via header field.

* * * * *